United States Patent
Yanase et al.

(10) Patent No.: US 8,220,065 B2
(45) Date of Patent: Jul. 10, 2012

(54) CONTENT DATA REPRODUCING APPARATUS WITH TEMPORARY DATA MEMORY

(75) Inventors: Tsutomu Yanase, Hamamatsu (JP); Ikuro Oshima, Machida (JP)

(73) Assignee: Yamaha Corporation, Hamamatsu-shi (JP)

( * ) Notice: Subject to any disclaimer, the term of this patent is extended or adjusted under 35 U.S.C. 154(b) by 1320 days.

(21) Appl. No.: 11/377,017

(22) Filed: Mar. 15, 2006

(65) Prior Publication Data
US 2006/0219087 A1    Oct. 5, 2006

(30) Foreign Application Priority Data

Mar. 29, 2005  (JP) .................................. 2005-093966

(51) Int. Cl.
*G06F 17/30* (2006.01)
(52) U.S. Cl. ............... 726/32; 726/31; 726/33; 726/26; 726/27; 380/201; 380/200; 705/57; 705/51; 709/232; 709/231
(58) Field of Classification Search .................. None
See application file for complete search history.

(56) References Cited

U.S. PATENT DOCUMENTS

| | | | |
|---|---|---|---|
| 4,857,912 A * | 8/1989 | Everett et al. .................. 340/508 |
| 6,308,272 B1 * | 10/2001 | Pearce ............................ 726/22 |
| 6,513,095 B1 * | 1/2003 | Tomori .......................... 711/103 |
| 7,039,815 B1 * | 5/2006 | Grassl et al. ................... 713/194 |
| 7,096,504 B1 * | 8/2006 | Tagawa et al. .................. 726/27 |
| 7,415,729 B2 * | 8/2008 | Ukeda et al. .................... 726/26 |
| 7,730,541 B2 * | 6/2010 | Kawaguchi et al. ............ 726/26 |
| 7,752,461 B2 * | 7/2010 | Hori et al. ..................... 713/193 |
| 7,921,181 B2 * | 4/2011 | Kawasaki ...................... 709/217 |
| 8,078,812 B2 * | 12/2011 | Yamamoto et al. ............ 711/159 |
| 2001/0049641 A1 | 12/2001 | Nakamura et al. |
| 2002/0053090 A1 * | 5/2002 | Okayama et al. ............... 725/152 |
| 2002/0199054 A1 * | 12/2002 | Akahane et al. ............... 711/103 |
| 2003/0009667 A1 * | 1/2003 | Horiuchi et al. ............... 713/168 |
| 2003/0104803 A1 * | 6/2003 | Adachi et al. .................. 455/412 |
| 2003/0217163 A1 | 11/2003 | Lagerweij et al. |

(Continued)

FOREIGN PATENT DOCUMENTS

EP    1 549 026 A2    6/2005

(Continued)

OTHER PUBLICATIONS

Notification of Reasons for Rejection for Japanese Patent Application No. 2005-093966, mailed Dec. 9, 2008 (5 pages).

(Continued)

*Primary Examiner* — Syed A. Zia
(74) *Attorney, Agent, or Firm* — Morrison & Foerster LLP

(57) ABSTRACT

In a content data reproducing apparatus having a temporary memory for stream reproduction, a content data acquisition section acquires content data from an external content provision server. A storage control section temporarily stores the content data acquired by the content data acquisition section in the temporary memory such that the stored content data should be erased from the temporary memory when a power supply is turned off. A reproduction condition acquisition section acquires reproduction condition data which defines a reproduction condition for reproducing the content data. A reproduction section reproduces the content data read from the temporary memory. A reproduction control section operates in case that the reproduction condition is satisfied for supplying the reproduction section with the content data read from the temporary memory for the reproduction, and operates in case that the reproduction condition is no more satisfied for erasing the content data from the temporary memory even before the power supply is turned off.

9 Claims, 8 Drawing Sheets

U.S. PATENT DOCUMENTS

| | | | |
|---|---|---|---|
| 2003/0217279 A1 | 11/2003 | Fuchigami et al. | |
| 2004/0210628 A1* | 10/2004 | Inkinen et al. | 709/201 |
| 2006/0135127 A1* | 6/2006 | Aarnio et al. | 455/412.1 |
| 2007/0210162 A1* | 9/2007 | Keen et al. | 235/451 |
| 2007/0239948 A1* | 10/2007 | Muraki et al. | 711/162 |
| 2008/0028477 A1* | 1/2008 | Lehmann et al. | 726/36 |

FOREIGN PATENT DOCUMENTS

| | | |
|---|---|---|
| EP | 1 549 026 A3 | 6/2005 |
| JP | 2002-006885 | 1/2002 |
| JP | 2002-163859 | 6/2002 |
| JP | 2002-230898 | 8/2002 |
| JP | 2002-2304806 | 10/2002 |
| JP | 2003-044058 A | 2/2003 |
| JP | 2003-114690 | 4/2003 |
| JP | 2003-299007 | 10/2003 |
| JP | 2003-333522 | 11/2003 |
| JP | 2004-117798 | 4/2004 |
| JP | 2004-220263 | 8/2004 |
| JP | 2005-050013 | 2/2005 |

OTHER PUBLICATIONS

Office Action mailed Feb. 29, 2008, for CN Patent Application No. 200610067897.5, with English Translation, 15 pages.

Partial European Search Report mailed Sep. 13, 2011, for EP Application No. 06111120.9, five pages.

* cited by examiner

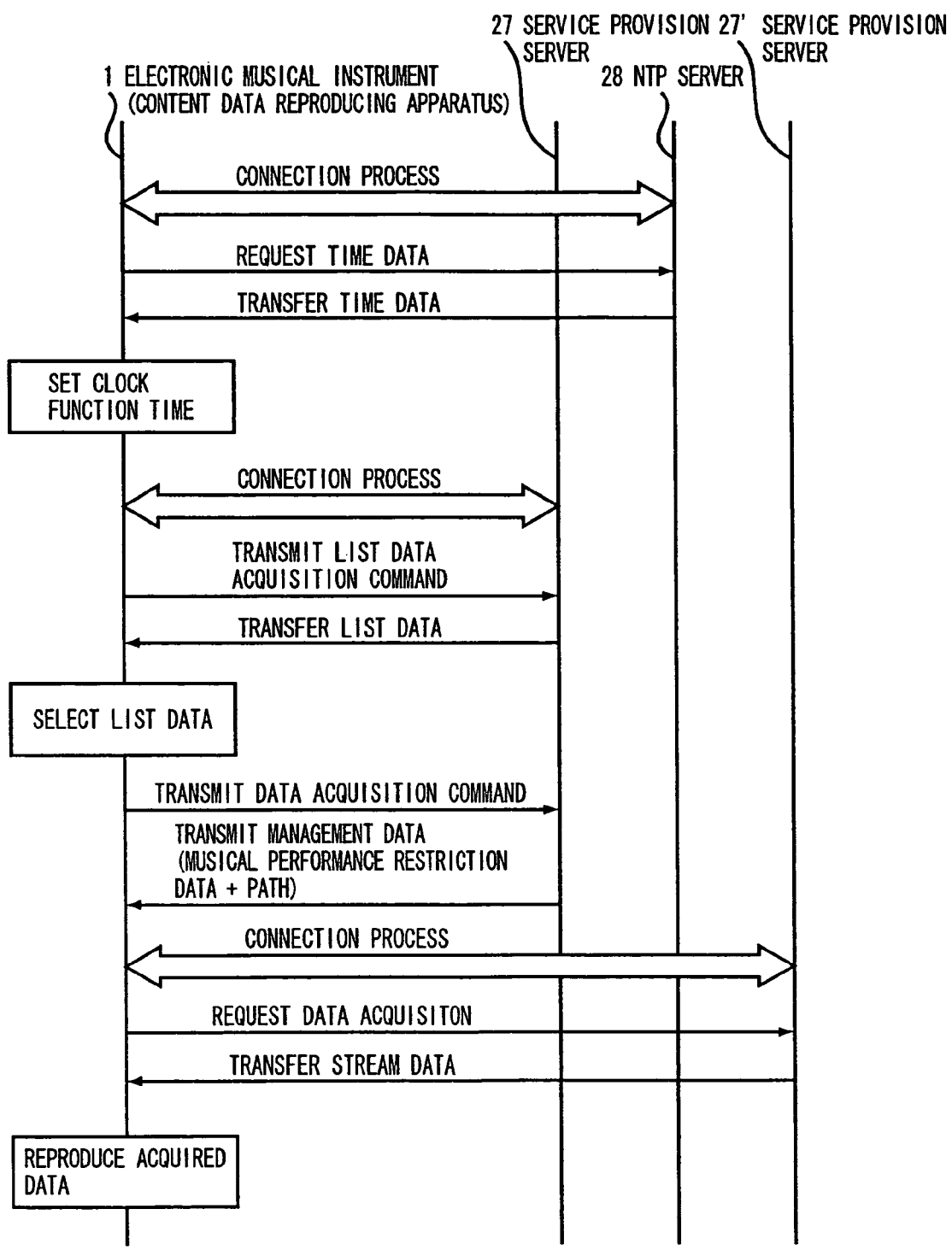

CONTENT DATA REPRODUCING APPARATUS WITH TEMPORARY DATA MEMORY

TECHNICAL FIELD

The present invention relates to a content data reproducing apparatus and a content data reproducing program to restrict the use of externally downloaded content data.

RELATED ART

It has been a conventional practice to stream content data, i.e., music or video downloadable from the outside, for distribution. However, copyright laws and regulations on the music distribution differ from countries to countries. For example, a reproduction system may be able to keep content data in a temporary memory up to 72 hours as long as the system is not turned off. Some countries assume such system to be the streaming distribution, and provide management for charging and limitations on the reproduction by users of such a system. In this case, the streaming reproduction includes not only content data that is obtained and reproduced realtime, but also content data that is partially or entirely stored in a temporary memory, and then subject to be reproduced later.

It is a general practice to restrict the use of streamed content data. Usage restrictions include limiting the number of copies of downloaded content data, restricting the reproduction function for downloaded content data according to the user's authority, and restricting operations of plug-in modules associated with downloaded content data.

[Patent document 1] Japanese Patent Application Laid-Open Publication No. 2004-117798
[Patent document 2] Japanese Patent Application Laid-Open Publication No. 2003-114690
[Patent document 3] Japanese Patent Application Laid-Open Publication No. 2004-220263

When the content data is musical performance data, however, the obtained musical performance data is once stored in the temporary memory and then subjected to be reproduced. In this case, the content data can be repeatedly read from the temporary memory as long as the machine is turned on. The musical performance data can be also reproduced repeatedly. This makes it difficult to restrict the number of sessions of reproduction.

Aside, the temporary memory is assigned to a volatile memory storage area of the machine. Therefore, turning the power off disables the stored data from being maintained, thereby losing the downloaded musical performance data. Even when the reproduction is restricted in such a manner as to enable the reproduction for a specified period from the time of obtaining the musical performance data, the data may disappear before the time limit. When the usage restriction is provided in terms of the reproduction period or the reproduction time, a clock function is needed for continuous operations during the power-off state, necessitating a clock battery and the like to always operate the clock function, thus increasing costs.

SUMMARY OF THE INVENTION

It is therefore an object of the present invention to provide a content data reproducing apparatus and a content data reproducing program capable of accurately restricting reproduction of content data obtained from the outside without increasing costs of the reproduction restriction if provided.

To achieve the above-mentioned object, there is provided a content data reproducing apparatus having a temporary memory for stream reproduction, comprising: a content data acquisition section that acquires content data from an external content provision server; a storage control section that temporarily stores the content data acquired by the content data acquisition section in the temporary memory such that the stored content data should be erased from the temporary memory when a power supply is turned off; a reproduction condition acquisition section that acquires reproduction condition data which defines a reproduction condition for reproducing the content data; a reproduction section that reproduces the content data read from the temporary memory; and a reproduction control section operative for supplying the reproduction section with the content data read from the temporary memory for the reproduction in case that the reproduction condition is satisfied, and operative for erasing the content data from the temporary memory before the power supply is turned off in case that the reproduction condition is not satisfied.

In one form, content data acquisition section acquires the content data which contains the reproduction condition data, and the reproduction condition acquisition section extracts the reproduction condition data from the acquired content data.

In another form, the preproduction condition acquisition section acquires the reproduction condition data together with destination information of the content data from an external content provision server, and the content data acquisition section acquires the content data from another external content provision server which is specified by the acquired destination information.

In a different form, the content data reproducing apparatus further comprises a time control section that acquires current date and time data from an external time source before acquiring the content data, and that sets an internal date and time according to the acquired current date and time data, wherein the reproduction control section determines whether the reproduction condition is satisfied or not with reference to the set internal date and time.

Preferably, the reproduction condition acquisition section acquires the reproduction condition data which determines the condition for reproducing the content data in terms of a maximum running time allowed for reproducing the content data, a maximum session count allowed for repeated sessions of reproducing the content data, or a maximum time period within which the reproducing of the content data is only allowed.

Preferably, the storage control section temporarily stores the content data in the temporary memory which is provided in a part of a random access memory. Otherwise, the storage control section temporarily stores the content data in the temporary memory which is provided in a part of a nonvolatile storage device.

There is also provided an inventive method of controlling a content data reproducing apparatus having a temporary memory for stream reproduction, the method comprising the steps of: acquiring content data from an external content provision server; temporarily storing the acquired content data in the temporary memory such that the stored content data should be erased from the temporary memory when the content data reproducing apparatus is turned off; acquiring reproduction condition data which defines a reproduction condition for reproducing the content data; determining whether the content data reproducing apparatus satisfies the reproduction condition each time the content data is to be reproduced; reproducing the content data read from the temporary memory in case that the reproduction condition is satisfied; and erasing the content data from the temporary memory even before the content data reproducing apparatus is turned off in case that the reproduction condition is no more satisfied.

Further, there is provided a machine readable medium for use in a content data reproducing apparatus having a processor and a temporary memory for stream reproduction, the medium containing a program executable by the processor for causing the content data reproducing apparatus to perform a method comprising the steps of: acquiring content data from an external content provision server; temporarily storing the acquired content data in the temporary memory such that the stored content data should be erased from the temporary memory when the content data reproducing apparatus is turned off; acquiring reproduction condition data which defines a reproduction condition for reproducing the content data; determining whether the content data reproducing apparatus satisfies the reproduction condition each time the content data is to be reproduced; reproducing the content data read from the temporary memory in case that the reproduction condition is satisfied; and erasing the content data from the temporary memory even before the content data reproducing apparatus is turned off in case that the reproduction condition is no more satisfied.

When the reproduction section reproduces content data, the inventive apparatus supplies the reproduction section with content data read from the temporary memory for reproduction in the case of satisfying a reproduction condition defined by the content reproduction condition data, and deletes the content data from the temporary memory in the case of not satisfying a reproduction condition defined by the content reproduction condition data. More specifically, the present invention deletes content data from the temporary memory when the acquired content data has been stored in the temporary memory and then becomes incapable of satisfying corresponding content reproduction condition data. This makes it possible to accurately place reproduction restrictions based on the reproduction condition determined in terms of one or more of the maximum running time, the maximum session count, and the maximum time period. Further, the inventive apparatus obtains a current date and time from external time management source before acquisition of content data to adjust the internal clock function to the acquired current date and time. Accordingly, it is possible to place reproduction restrictions based on the reproduction condition composed of either or both the maximum running time and the maximum time period without increasing costs.

BRIEF DESCRIPTION OF THE DRAWINGS

FIG. 8 is a schematic sequence diagram for the electronic musical instrument having the streaming data reproducing apparatus according to the third embodiment of the present invention to obtain content data from the service provision server.

DETAILED DESCRIPTION OF THE INVENTION

The object of the present invention is to provide a content data reproducing apparatus and a content data reproducing program capable of accurately restricting reproduction of content data obtained from the outside. We attained this object as follows. When reproduction means reproduces content data, the content data may satisfy a reproduction condition specified by content reproduction condition data. In this case, the reproduction means is supplied with the content data read from a temporary memory to reproduce the content data. Normally, the stored content data is erased from the temporary memory when a power supply is turned off. In some case, the content data may not satisfy the reproduction condition specified by the content reproduction condition data. In this case, the content data is forcibly deleted from the temporary memory even before the power supply is turned off. More specifically, there may be a case where the temporary memory successfully stores the obtained content data, and then the obtained content data no more satisfy corresponding content reproduction condition data. At this time, the content data is deleted from the temporary memory.

Figure 1:
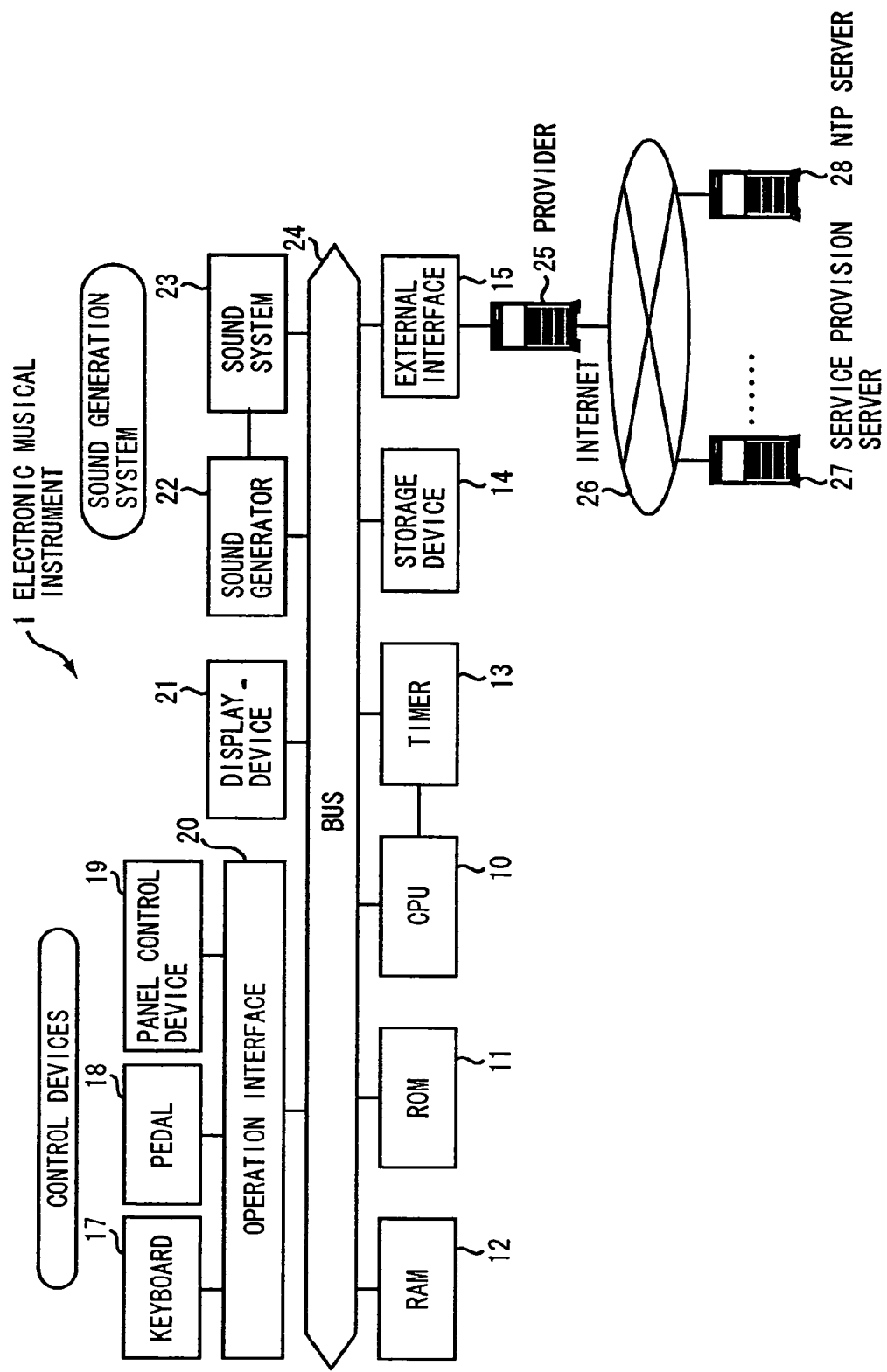
FIG. 1 is a block diagram showing the configuration of an electronic musical instrument having the content data reproducing apparatus according to a first embodiment of the present invention.

FIG. 1 shows a block diagram of an electronic musical instrument having a first embodiment of the content data reproducing apparatus according to the present invention. In this case, executing a content data reproducing program on an electronic musical instrument 1 implements the content data reproducing apparatus.

In the electronic musical instrument 1 as shown in FIG. 1, a CPU (Central Processing Unit) 10 controls overall operations of the electronic musical instrument, controls musical sound generation, obtains and reproduces content data as the content data reproducing apparatus. ROM (Read Only Memory) 11 stores operating software for musical sound generation control, a content data reproducing program, and the like executed by the CPU 10. RAM (Random Access Memory) 12 provides storage areas such as a work area for the CPU 10 and a temporary memory area. When the ROM 11 uses rewritable ROM such as flash memory, various programs such as the operating software can be rewritten, making it possible to easily upgrade various programs. A timer 13 has a clock function backed up by a power supply to manage the time and supply the CPU 10 with the timing of a timer interrupt.

A storage device 14 provides a volatile storage area for storing various data such as musical performance data (content data) downloaded from a service provision server 27 via an Internet 26, and provides a nonvolatile storage area for storing various application programs such as an automatic playing program. The storage device 14 can be composed of a generally nonvolatile storage device such as an HDD (Hard Disk Drive), an FDD (Floppy (registered trademark) Disk Drive), CD (Compact Disk) ROM, an MO (Magneto Optical Disk), and a DVD (Digital Versatile Disk). An external interface 15 connects the electronic musical instrument 1 to a communication network including a LAN (local area network), the Internet 26, and a telephone line. The electronic musical instrument can connect to external devices such as a service provision server 27 and an NTP server 28 via the communication network. In this manner, it is possible to download content data such as various programs and musical performance data from the external devices.

As control devices, a keyboard 17 and a pedal 18 are provided for a user to play music. Further, a panel control device 19 is provided on a panel to control various settings. Using the panel control device 19, a user can issue instructions to connect to the service provision server 27 on the Internet 26 so as to enjoy streaming services. These control devices are connected to a bus 24 via an operation interface 20. The operation interface 20 scans the control devices 17 through 19 to detect events for these control devices and supplies event output to the control device where an event has occurred. A display device 21 has a display portion such as a liquid crystal display. The display device 21 can allow the display portion to display not only setup screens for the electronic musical instrument 1, music scores and lyrics of musical compositions to be played, but also menus and contents of streaming services to be provided. A user can use images displayed on the display device 21 as the GUI (Graphical User Interface) to select musical performance data and instruct to start or stop the reproduction. A sound generation system is composed of a sound generator 22 and a sound system 23. The sound generation system receives musical performance data to generate musical sound data from the sound generator 22. The sound system 23 adds effects to the musical sound data, amplifies it as needed, and generates a musical sound from a speaker. The sound generator 22 may be a waveform memory sound generator having waveform memory, and an FM sound generator, and the like. Under control of the CPU 10, the sound generator 22 performs a musical sound generation process to generate musical sound waveform data. The sound system 23 can control sound volume and quality. These components are connected to the bus 24.

A provider 25 is a telecommunications carrier that provides Internet connection services. The electronic musical instrument 1 connects to the provider 25 by means of ADSL connection, dial-up connection, or leased line connection to be able to use Internet services. The service provision server 27 provides necessary services in response to accesses from multiple users. There are the multiple service provision servers 27 on the Internet. The service provision server 27 streams contents such as musical performance data, music, and video to users. The NTP (Network Time Protocol) server 28 is a timestamp server that manages the current date and time provided on the network. Issuing an inquiry to the NTP server 28 can adjust a clock for networkable electronic devices to the current date and time.

With reference to FIGS. 2 through 7, the following describes the first embodiment of the content data reproducing apparatus provided or the electronic musical instrument 1 according to the present invention.

Figure 2:
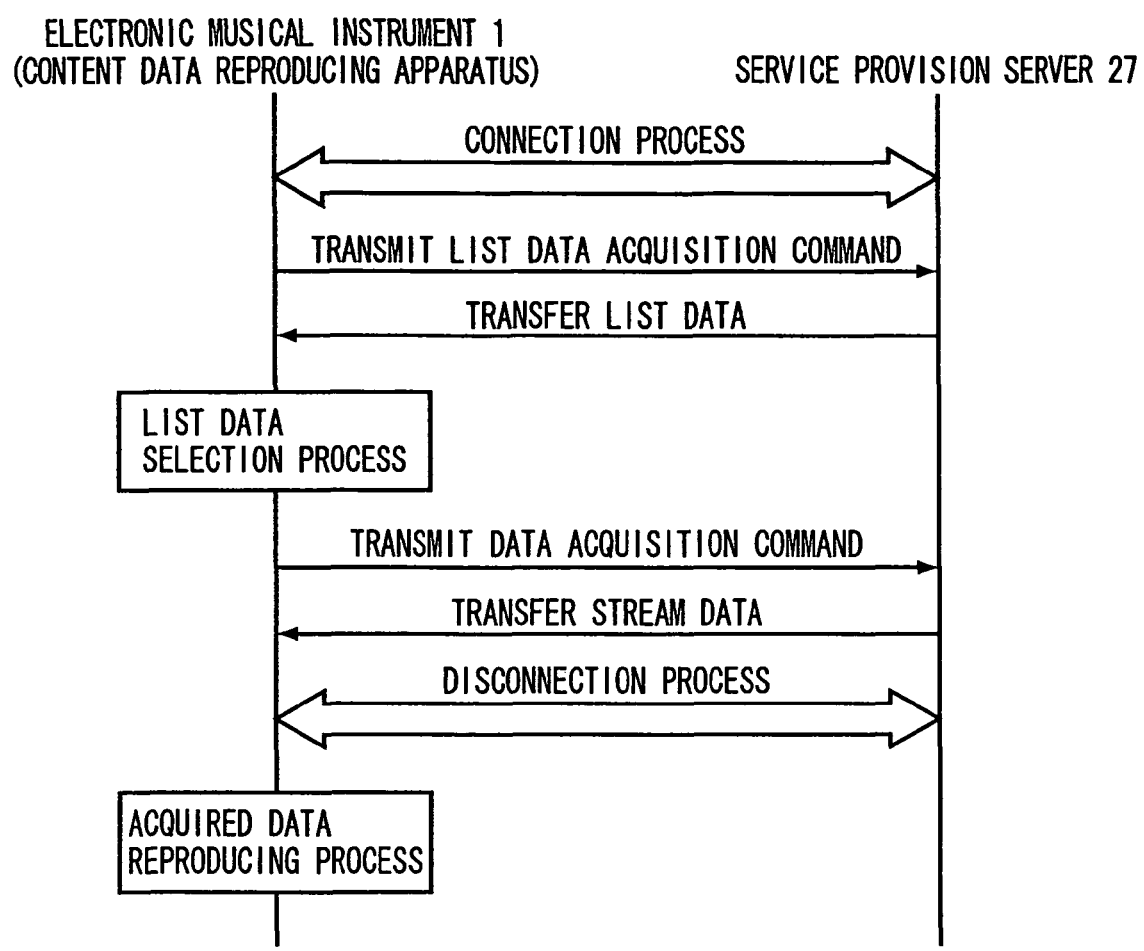
FIG. 2 is a sequence diagram for the electronic musical instrument having a streaming data reproducing apparatus according to the first embodiment of the present invention to obtain content data from a service provision server.

FIG. 2 schematically shows a sequence diagram for the electronic musical instrument 1 to obtain content data from the service provision server 27. The content data reproducing apparatus according to the first embodiment obtains content data as desired musical performance data from the service provision server 27 by means of streaming distribution. A streaming distribution protocol to be used is selected from any of UDP (User Datagram Protocol) for best-effort datagram-oriented communication, TCP (Transmission Control Protocol) for reliable session-oriented communication, and HTTP (HyperText Transfer Protocol), i.e., a very simple protocol using requests and responses as independent communication units. The sequence diagram in FIG. 2 will be described below. To be eligible for the streaming distribution, a user operates the panel control device 19 to connect to the service provision server 27 on the Internet 26 and enable a streaming service. This triggers a connection process between the electronic musical instrument 1 and the service provision server 27. The electronic musical instrument 1 is connected to the service provision server 27 via the external interface 15, the provider 25, and the Internet 26.

When connected to the service provision server 27, the electronic musical instrument 1 issues a list data acquisition command to the service provision server 27. In response to this command, the service provision server 27 transfers list data capable of the streaming service to the electronic musical instrument 1. The list data acquired by the electronic musical instrument 1 provides a list of titles of songs to be streamed. The display device 21 displays this list on a menu screen for the streaming service. A user can reference a song title displayed on the menu screen to select content data associated with the desired musical performance data. In this case, it may be preferable to use a browser, i.e., application software for browsing web pages, to obtain the list data and display song titles on the display device 21.

When the user uses the panel control device 19 to perform a data acquisition request operation for acquiring the content data, a command for acquiring the content data and selection information about the content data are transmitted to the service provision server 27. The service provision server 27 receives the data acquisition command and streams the musical performance data selected by the selection information to the electronic musical instrument 1. The electronic musical instrument 1 receives the streamed musical performance data. The content data reproducing apparatus stores the streamed musical performance data in a temporary memory area of the storage device 14. The content data reproducing apparatus then performs a disconnection process to release the communication connection between the electronic musical instrument 1 and the service provision server 27.

Figure 7:
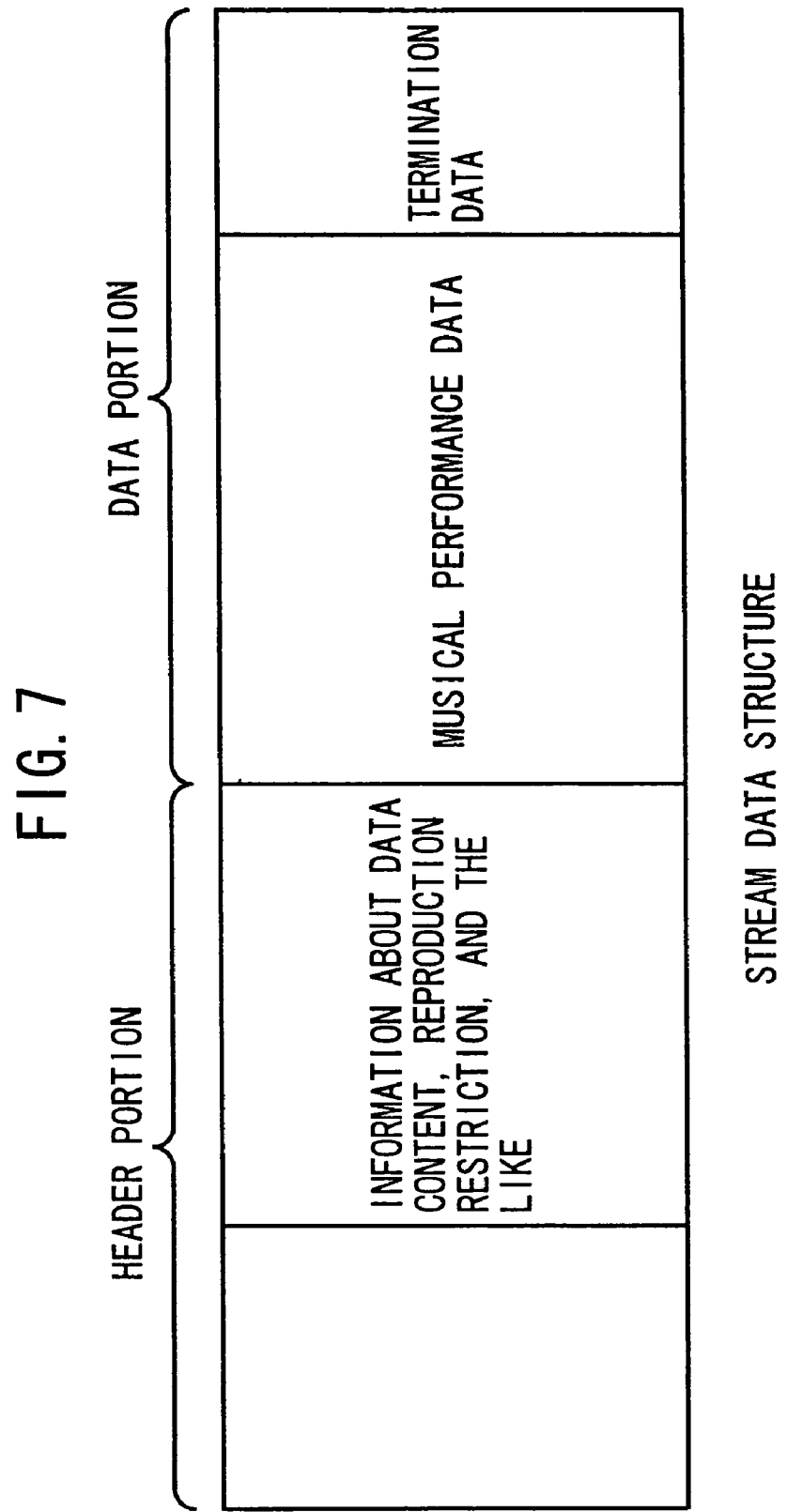
FIG. 7 is a diagram exemplifying the data structure of the stream data.

When the musical performance data is streamed, the content reproduction condition data is contained in a stream data's header. FIG. 7 exemplifies the data structure of the stream data. As shown in FIG. 7, the stream data is composed of a header portion and a data portion. The header portion contains distribution destination information, distribution origin information, information about data content, and reproduction condition data. The data portion is composed of musical performance data and termination data indicating the end of the musical performance data.

When the stream data is obtained, the electronic musical instrument 1 performs a process to reproduce the stream data. At this time, it is determined whether or not to satisfy a content reproduction condition defined by the content reproduction condition data extracted from the stream data. When the content reproduction condition is satisfied, the musical performance data read from the storage device 14 is supplied to the sound generator 22 for reproduction each time an event of the musical performance data reaches the corresponding reproduction timing. When it is determined that the content reproduction condition data extracted from the stream data is not satisfied, the musical performance data stored in the temporary memory area of the storage device is deleted and is disabled for reproduction afterwards even before the electronic musical instrument is turned off.

The content reproduction condition represents one of or a combination of these reproduction conditions: a maximum running time to allow the reproduction for a specified time duration; a maximum session count to limit the reproduction of the obtained content data to a specified number of sessions; and a maximum time period to allow the reproduction for a specified period from the acquisition of the content data. The musical performance data distributed as stream data is available as an SMF (Standard MIDI File), i.e., the standard file format for MIDI music data.

Figure 3:
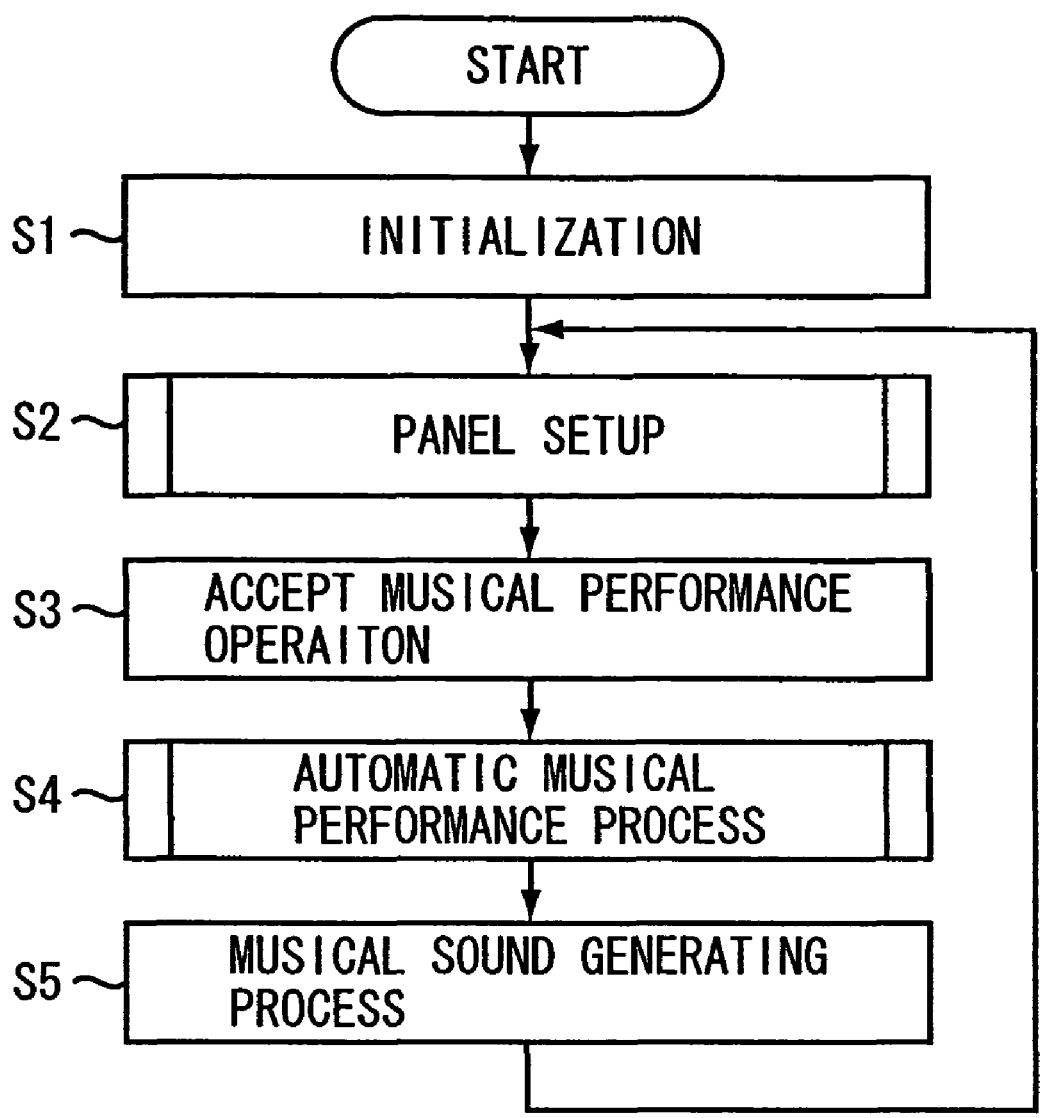
FIG. 3 is a flowchart of a main process performed by the electronic musical instrument having the streaming data reproducing apparatus according to the first embodiment of the present invention.

FIG. 3 shows a flowchart of a main process performed by the electronic musical instrument 1 having the streaming data reproducing apparatus according to the first embodiment of the present invention.

The main process in FIG. 3 starts at the time of turning on the power of the electronic musical instrument 1 and is repeated until turning off the power. When the electronic musical instrument 1 is turned on, the main process starts to initialize the electronic musical instrument 1 at Step S1. Various registers and the RAM 12 are initialized. The most recent setup data is resumed. When the most recent setup is unavailable, the default setup data is assumed. At Step S2, the main process performs a panel setup process. The panel setup process detects states of the panel control device 19 operated by the user and provides the electronic musical instrument 1 with various settings depending on detection states. The panel setup process includes a process to stream musical performance data from the service provision server 27.

A musical performance acceptance process at Step S3 detects operations of the keyboard 17 and the pedal 18. The process supplies the sound generator 22 with note data and velocities as well as note-on data from the operated keyboard 17. Further, the process generates a musical sound control signal corresponding to the operated pedal 18 and supplies the signal to the sound generator 22. In this manner, the user can use the electronic musical instrument 1 for manual musical performance. At Step S4, an automatic musical performance process is carried out to successively read automatic musical performance data from the storage device 14, and supplies each event in the automatic musical performance data to the sound generator 22 for reproduction at each timing of reproducing the event. At Step S4, the main process also performs the automatic musical performance process for musical performance data obtained from a streaming service. A musical sound generating process of Step S5 performs a process from generating musical sound in the sound generator 22 based on the musical performance data according to the musical performance operation or based on the musical performance data according to the automatic musical performance process to generate the sound from the speaker of the sound system 23.

Figure 4:
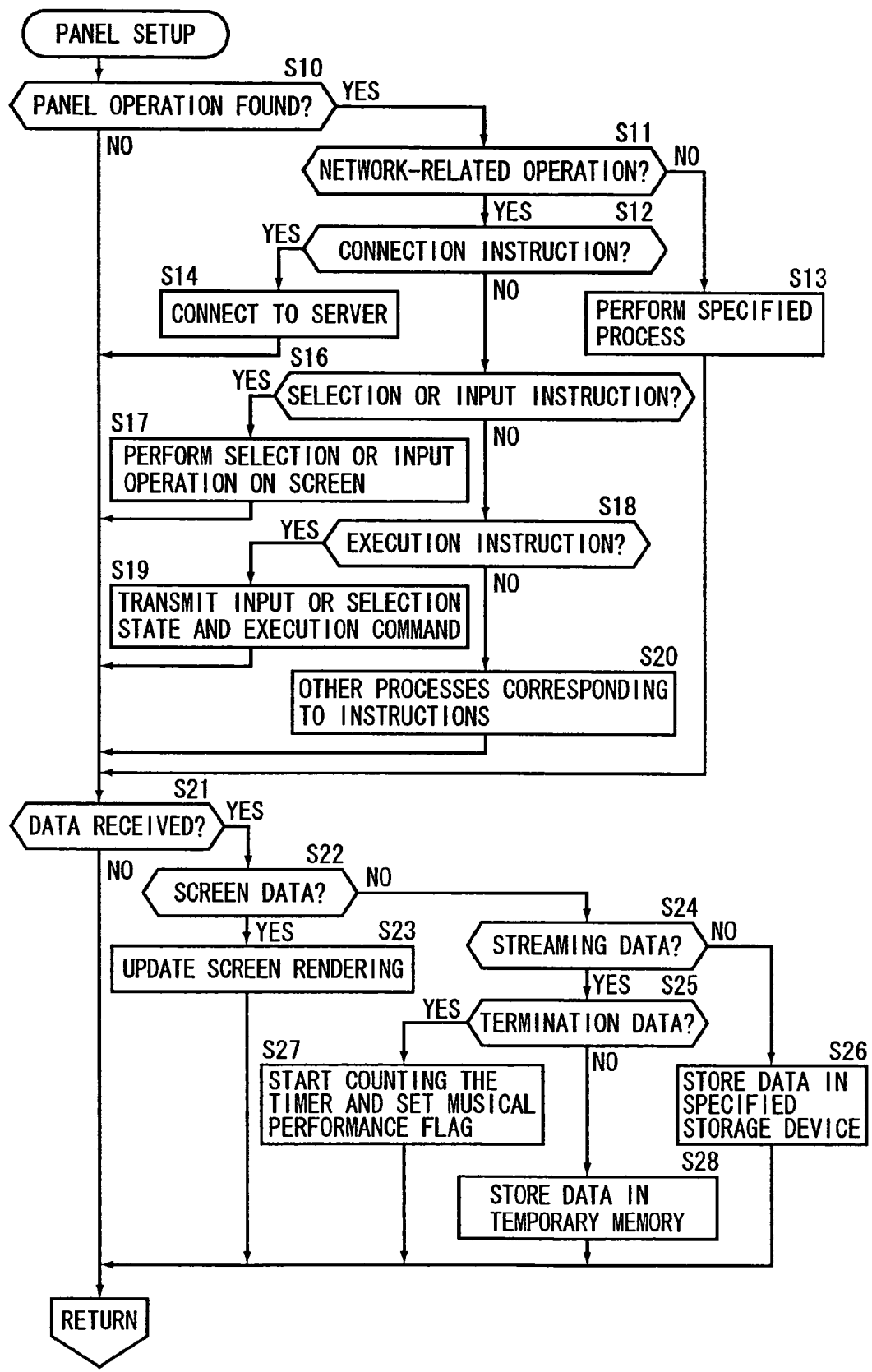
FIG. 4 is a flowchart of the panel setup process performed at Step S2 in the main process performed by the electronic musical instrument having the streaming data reproducing apparatus according to the first embodiment of the present invention.

FIG. 4 shows a flowchart of the panel setup process performed at Step S2 in the main process.

When the panel setup process starts, the main process determines at Step S10 whether or not the panel control device 19 is operated. When it is detected that the user operates any panel control device on the panel, the process proceeds to Step S11. When it is detected that the user operates no panel control device, the process proceeds to Step S21. At Step S11, the process determines whether or not the operation of the panel control device 19 is a network-related operation such as accepting the streaming data distribution from the service provision server 27 on the Internet 26. When the operation is determined to be the network-related operation, the process proceeds to Step S12. At Step S12, the process determines whether or not an instruction is issued to connect to the network. When the instruction is issued to connect to a networked server (e.g., the service provision server 27 on the Internet 26), the process branches to Step S14 and performs a process for connecting to the specified service provision server 27 and the like on the Internet 26. When the external interface 15 is assumed to be a wireless LAN, the process connects to the provider 25 via an air station. The process performs the connection process by negotiating with the specified server on the Internet 26 (in such a manner as to notify an ID, password, type of device to be connected, and the like). When the connection process at Step S14 terminates, the process proceeds to Step S21.

When it is determined at Step S12 that the instruction is not associated with connection to the network, the process proceeds to Step S16 to determine whether or not the operation on the panel control device 19 is associated with an input instruction. When the operation is determined to be associated with a selection or input instruction, the process branches to Step S17 to render pictures or text on the screen of the display device 21 in accordance with the operation for the selection or input instruction. The text rendering corresponds to text input. The selection rendering corresponds to selections made by operating a pointing device such as a mouse. When the user enters text for acknowledging the streaming distribution or selects a desired song title and the like, for example, the associated image rendering is performed and a result is displayed on the display device 21. When the process at Step S17 terminates, the process proceeds to Step S21. When it is determined at Step S16 that the operation on the panel control device 19 is not associated with a selection or input instruction, the process proceeds to Step S18 to determine whether or not the operation on the panel control device 19 is associated with an instruction for execution.

When it is determined at Step S18 that the operation on the panel control device 19 is associated with an instruction for execution, the process proceeds to Step S19. There is provided a command to specify the input or selection performed by the operation on the panel control device 19 at Step S17 for the previous panel setup process. The process transmits this command as well as an execution command to the network. When the process at Step S19 terminates, the process proceeds to Step S21. When it is determined at Step S18 that the operation on the panel control device 19 is not associated with the instruction for execution, the process proceeds to Step S20 to perform a process in accordance with the operation. This operation includes general operations for the electronic musical instrument 1 such as configuring the automatic musical performance, configuring effects, and selecting timbres. When the process at Step S20 terminates, the process proceeds to Step S21.

When it is determined at Step S11 that the operation on the panel control device 19 is not network-related, the process branches to Step S13. At Step S13, the process specified by the operation on the panel control device 19 is performed. This process configures timbres, volumes, and the like in the automatic musical performance process, for example.

At Step S21, it is determined whether or not data is received from the network. When it is determined that data is received from the network, the process proceeds to Step S22, and determines whether or not the received data is screen data. When the received data is determined to be screen data, the process proceeds to Step S23 to update the screen rendering state of the display device 21 in the electronic musical instrument 1. For example, the screen data represents list data that lists song titles of distributable musical performance data obtained from the service provision server 27 during the streaming distribution. In this case, it may be preferable to use a browser, i.e., application software for browsing web pages, to obtain the list data and display it on the display device 21. When it is determined at Step S22 that the received data is not screen data, the process proceeds to Step S24 to determine whether or not the received data is streaming data.

When it is determined at Step S24 that the received data is streaming data, the process proceeds to Step S25 to determine whether or not the data is termination data. When it is determined at Step S25 that the received data is not termination data, the process proceeds to Step S28 to store the received data in the temporary memory area allocated in the nonvolatile storage device 14. The temporary memory area is volatile such that the stored content data should be erased from the temporary memory area when a power supply is turned off. When it is determined at Step S25 that the received data is termination data as shown in FIG. 7 indicating the end of the musical performance data, the process branches to Step S27 to start counting the timer. In addition, the process sets a musical performance flag to reproduce the musical performance data corresponding to the stream data stored in the temporary memory area allocated in the storage device 14. The timer count starts because it is necessary later to check whether the reproduction condition is satisfied to allow the reproduction only within a specified time period from the acquisition of the streaming data.

When it is determined at Step S24 that the received data is not streaming data, the process proceeds to Step S26 to store the user-specified data received in the storage device 14. When the processes at Steps S23, S26, S27, and S28 terminate, the panel setup process terminates and returns control to Step S3 of the main process.

Figure 5:
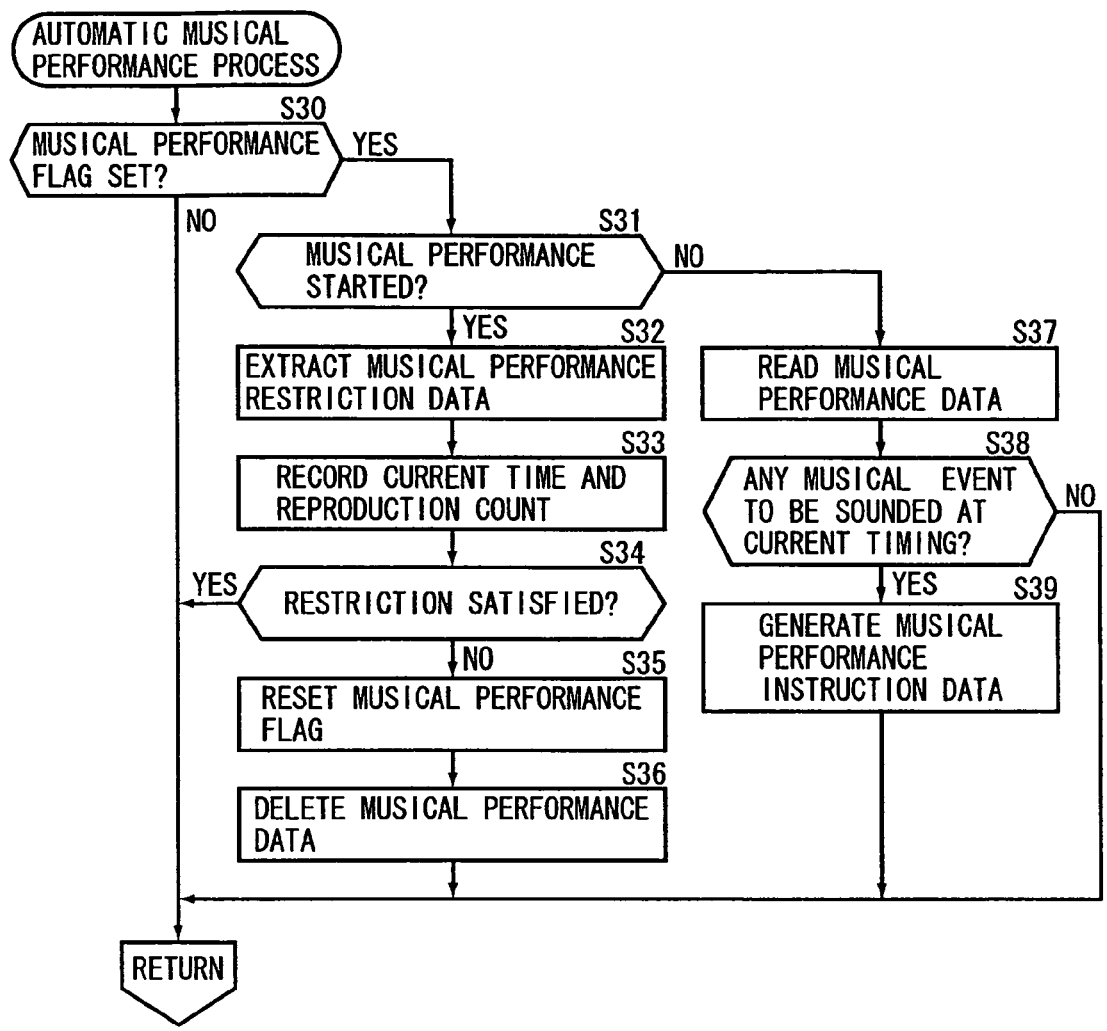
FIG. 5 is a flowchart of the automatic musical performance process performed at Step S4 of the main process performed by the electronic musical instrument having the streaming data reproducing apparatus according to the first embodiment of the present invention.

FIG. 5 shows a flowchart of the automatic musical performance process performed at Step S4 of the main process.

When the automatic musical performance process starts, it is determined at Step S30 whether or not a musical performance flag is set so as to reproduce musical performance data. This musical performance flag is set when there is provided an instruction to reproduce user-specified musical performance data. Further, the musical performance flag is automatically set when the electronic musical instrument 1 is provided with a streaming service from the service provision server 27 and terminates the reception of the musical performance data as streaming data. When it is determined that the musical performance flag is set so as to reproduce musical performance data, the process branches to Step S31 to determine whether or not to start the musical performance. There may be a case where the most recent automatic musical performance process did not set the musical performance flag. When the musical performance flag is detected to be set for the first time and the musical performance is determined to start, the process proceeds to Step S32 to extract musical performance restriction data. When the musical performance data to be automatically played is stream data obtained from the service provision server 27, the streaming data's header contains the musical performance restriction data as content reproduction condition data.

The process proceeds to Step S33 to record the timer's current time, of which count has started at Step S27 above, and a reproduction count incremented by 1. It is determined at Step S34 whether or not the recorded time and reproduction count conform to the range of the musical performance restriction data (content reproduction condition data). At this time, the musical performance restriction data (content reproduction condition data) represents any of or a combination of time data and reproduction count data. The time data indicates a specified time period capable of the reproduction measured from the data acquisition. The reproduction count data indicates a specified count capable of the reproduction measured from the data acquisition. When it is determined that the time and the reproduction count recorded at Step S34 satisfy the musical performance restriction data (content reproduction condition data), the automatic musical performance process terminates. When it is determined that the time and the reproduction count recorded at Step S34 do not conform to the musical performance restriction data (content reproduction condition data), the process proceeds to Step S35 to reset the musical performance flag and then proceeds to Step S36. At Step S36, the process deletes the musical performance data determined not to satisfy the scope of musical performance restriction data (content reproduction condition data) from the storage device 14 so as to disable reproduction of that musical performance data. The automatic musical performance process then terminates.

There may be a case where the most recent automatic musical performance process set the musical performance flag and therefore the musical performance is assumed to be in progress. When the musical performance is not determined to start at Step S31 for this reason, the process branches to Step S37 to read the musical performance data being played from the storage device 14. At Step S38, the process determines whether or not there is an event to be sounded at the current timing. When it is determined that there is an event to be sounded at the current timing, the process proceeds to Step S39 to generate musical performance instruction data corresponding to the event and supplies this data to the sound generator 22. When it is determined that there is no event to be sounded at the current timing, the automatic musical performance process terminates. When the automatic musical performance process terminates, control returns to Step S5 of the main process.

Figure 6:
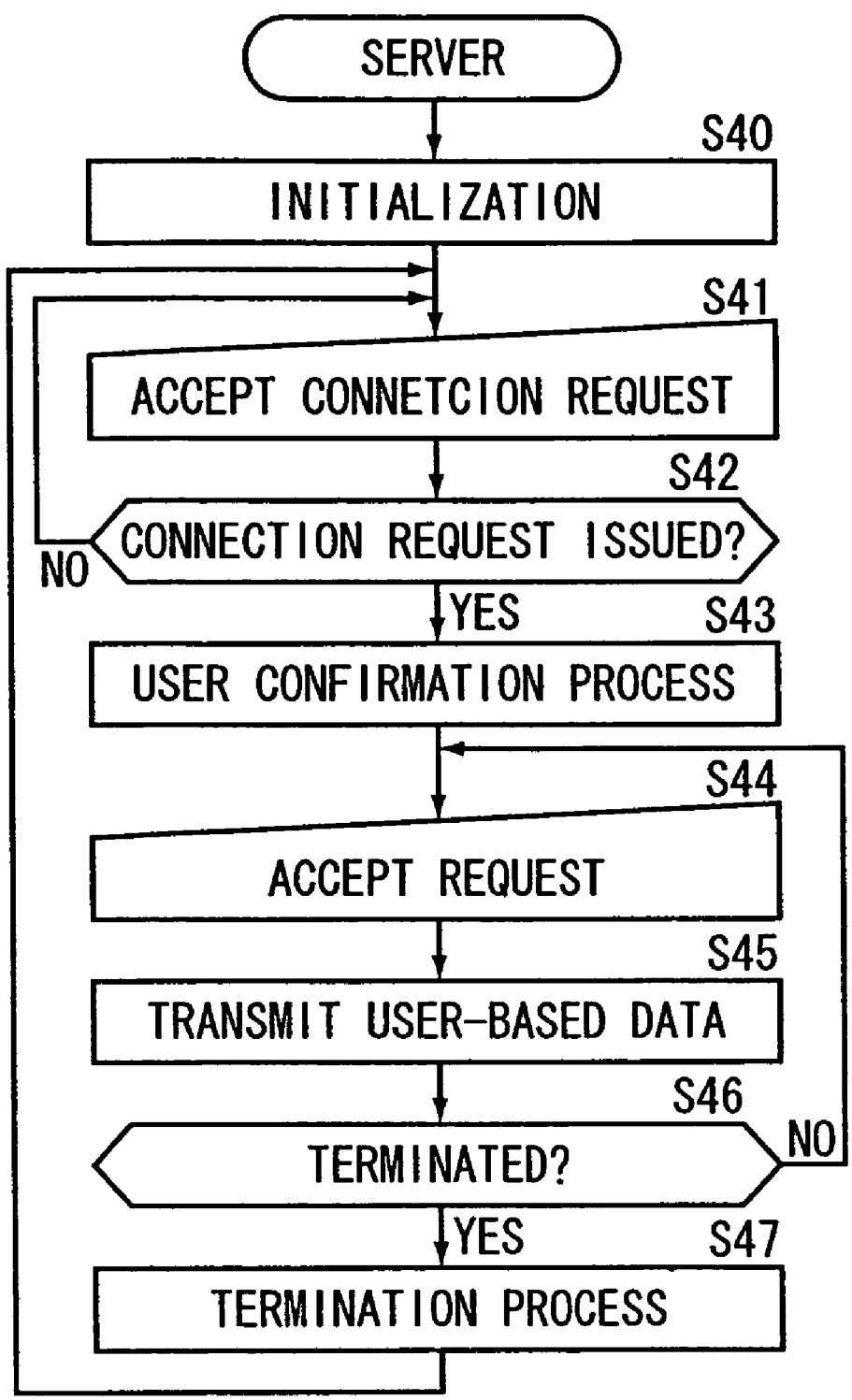
FIG. 6 is a flowchart showing a server process performed by the service provision server.

FIG. 6 is a flowchart showing a server process performed by the service provision server 27.

The service provision server 27 is available on the Internet 26 and streams various service information and musical performance data to clients such as the electronic musical instrument 1 and the like. Turning on the service provision server 27 starts the server process. At Step S40, the service provision server 27 is initialized. Various registers and the RAM are initialized. The most recent setup data is resumed. When the most recent setup is unavailable, the default setup data is assumed. When the client issues a connection request, the process identifies the client and accepts the connection request at Step S41. At Step S42, the process determines whether or not the client issues a connection request. When the connection request from the client is already accepted at Step S41, the process assumes that determination to be affirmative and proceeds to Step S43. When no connection request is accepted from the client, the process assumes that determination to be negative and returns to Step S41. The process is repeated between Steps S41 and S42 until the connection request from the client is accepted at Step S41.

Let us assume that the connection request from the client is accepted at Step S41 and the process proceeds to Step S43. At Step S43, the process confirms the user as a client. This process is performed to confirm whether the user is registered to be eligible to be provided with all data or unregistered to be eligible to be provided with only limited data. At Step S44, the process accepts requests such as a user's request to obtain streaming data and supplies the user with user-based data corresponding to the user confirmed at Step S43. In this case, full musical performance data is streamed to a user who is authorized to be supplied with all data. Demo musical performance data is streamed to a user who is authorized to be supplied with limited data.

When the user-based data is transmitted, the process proceeds to Step S46 to determine whether or not user-based data corresponding to all requests has been transmitted to the end. When it is determined that there remains a request not accepted from the user and all the requested user-based data is not transmitted, the process returns to Step S44. The process at Steps S44 and S45 is repeated. The process then accepts the next request and transmits user-based data corresponding to the request to the user. When the process proceeds to Step S46 to determine that user-based data corresponding to all the requests has been transmitted to the end, the process proceeds to Step S47 to perform a termination process for releasing the connection with the client that has issued the connection request. Upon completion of Step S47, the process returns to Step S41 and performs Steps S41 through S47 for a client that has issued the connection request next. While the service provision server 27 is turned on, the process from Steps S41 to S47 is successively performed for clients that have issued connection requests.

The following describes a second embodiment of the content data reproducing apparatus provided for the electronic musical instrument 1 according to the present invention. An electronic musical instrument provided with the content data reproducing apparatus according to the second embodiment has the same configuration as that of the electronic musical instrument 1 as shown in FIG. 1.

According to the second embodiment of the content data reproducing apparatus, the electronic musical instrument 1 obtains content data from the service provision server 27 in the same sequence as that shown in FIG. 2. Referring now to FIG. 2, the following describes the second embodiment of the content data reproducing apparatus. The content data reproducing apparatus according to the second embodiment obtains content data such as desired musical performance data from the service provision server 27 by means of streaming distribution. The streaming distribution uses any of such protocols as UDP, TCP, and HTTP. To enable the streaming distribution, the user operates the panel control device 19 to connect to the service provision server 27 on the Internet and issue an instruction to enjoy the streaming service. In this manner, the connection process is performed between the electronic musical instrument 1 and the service provision server 27. The electronic musical instrument 1 is connected to the service provision server 27 via the external interface 15, the provider 25, and the Internet 26.

When connected to the service provision server 27, the electronic musical instrument 1 transmits a list data acquisition command to the service provision server 27. In response to the command, the service provision server 27 transfers list data triggering the streaming service to the electronic musical instrument 1. The electronic musical instrument 1 obtains the list data, i.e., a list of song titles available in the streaming service, a URL (Uniform Resource Locator) indicating the location of musical performance data corresponding to the song on the Internet, and time information as a content reproduction condition. A menu screen displayed on the display device 21 shows a song title, but not its URL or time information. A user can reference the song title displayed on the menu screen to select the content data as desired musical performance data. In this case, it may be preferable to use a browser, i.e., application software for browsing web pages, to obtain the list data to display the song title and the like on the display device 21.

When the user uses the panel control device 19 to issue a data acquisition request for the content data, the electronic musical instrument 1 references the URL associated with the selected song title and transmits a command for obtaining the content data to the URL. The service provision server 27 receives the data acquisition command and streams musical performance data indicated by the URL to the electronic musical instrument 1. The electronic musical instrument 1 receives the streamed musical performance data. The content data reproducing apparatus downloads the streamed musical performance data by storing it in the temporary memory area allocated in the RAM 12. The stored content data should be erased from the temporary memory when a power supply is turned off. The content data reproducing apparatus performs a disconnection process to release the communication connection between the electronic musical-instrument 1 and the service provision server 27. When downloading the musical performance data (content data) associated with the selected song title to the temporary memory, the content data reproducing apparatus references the list data to obtain the time information attached to the selected song title. The obtained time is set to the timer 13. In this manner, the temporary memory temporarily stores the musical performance data corresponding to the selected song title until the timer 13 expires. When the timer 13 expires, the musical performance data is replaced by null musical performance data and is deleted from the temporary memory even when the power supply is maintained.

Let us suppose that the content data reproducing apparatus according to the second embodiment downloads the musical performance data corresponding to the selected song title and instructs reproduction of the musical performance data. The musical performance data is then read from the temporary memory in the RAM 12 and is supplied to the sound generator 22 for reproduction each time an event of the musical performance data reaches the reproduction timing. In this case, the musical performance data can be reproduced when the time to reproduce the musical performance data is earlier than the expiration of the timer 13 specified for the musical performance data. When the time to reproduce the musical performance data is later than the expiration of the timer 13, the musical performance data cannot be reproduced because it is already deleted from the temporary memory. The content data reproducing apparatus according to the first embodiment deletes musical performance data during the automatic musical performance process. The content data reproducing apparatus according to the second embodiment replaces the musical performance data upon the expiration of the timer 13 with null musical performance data to thereby delete that musical performance data from the temporary memory independently of whether or not the automatic musical performance process is performed. Stream data to be streamed is composed of a header portion and a data portion. The header portion contains information about transmission destination and origin, and data contents. The data portion is composed of musical performance data and termination data indicating the end of the musical performance data. The musical performance data is available as an SMF (Standard MIDI File), i.e., the standard file format for MIDI music data.

In the above-mentioned description, the content data reproducing apparatus according to the second embodiment provides the content reproduction condition only in terms of the maximum time period that allows the reproduction only for a specified time period after content data acquisition. Further, it may be preferable to add the reproduction condition of the maximum session count to limit the reproduction of the obtained content data to a predetermined number of times. In this case, the list data obtained by the electronic musical instrument 1 contains the song title information capable of the streaming service, the URL indicating the location of musical performance data corresponding to the song on the Internet, and the time information and the maximum session count as the content reproduction condition. Under the given reproduction conditions, the current time of reproducing the musical performance data needs to be earlier than the expiration of the timer 13 specified for the musical performance data to be reproduced. In addition, the current session number of the specified reproductions needs to be smaller than or equal to the maximum session count for the musical performance data to be reproduced. Under these conditions, the musical performance data can be read from the temporary memory in the RAM 12 and supplied to the sound generator 22 for reproduction each time an event of the musical performance data reaches the reproduction timing. However, the musical performance data is already deleted from the temporary memory and cannot be reproduced when the reproduction is called after expiration of the timer or when the number of specified reproductions exceeds the maximum session count.

To delete musical performance data based on the maximum time period restriction, the musical performance data is replaced by null musical performance data and is deleted from the temporary memory when the timer 13 expires. To delete musical performance data based on the maximum session count limitation, the automatic musical performance process deletes the musical performance data similarly to the content data reproducing apparatus according to the first embodiment. In this case, the temporary memory stores the downloaded musical performance data. Accordingly, the musical performance data is deleted from the temporary memory.

The following describes a third embodiment of the content data reproducing apparatus provided for the electronic musical instrument according to the present invention.

The electronic musical instrument having the content data reproducing apparatus according to the third embodiment has the same configuration as that shown in FIG. 1 except the timer 13. The description about the components other than the timer 13 will be omitted. The timer 13 has a clock function not backed up by a power supply. The timer 13 manages the current time and supplies the CPU 10 with the timing of a timer interrupt. When the electronic musical instrument 1 starts services on the network or is turned on, the electronic musical instrument 1 inquires the current date and time from the NTP server 28 and sets the current date and time to the clock function. When the electronic musical instrument 1 in operation requires the clock function, the function indicates the current date and time.

FIG. 8 schematically shows a sequence diagram for the electronic musical instrument 1 having the content data reproducing apparatus according to the third embodiment to obtain content data from the service provision server 27. The content data reproducing apparatus according to the third embodiment obtains content data such as desired musical performance data from the service provision server 27 by means of streaming distribution. Similarly to the first embodiment, a streaming distribution protocol to be used is selected from any of UDP, TCP, and HTTP. To be eligible for the streaming distribution, a user operates the panel control device 19 to connect to the service provision server 27 on the Internet 26 and enable a streaming service.

A connection process is performed between the electronic musical instrument 1 and the NTP server 28 before the electronic musical instrument 1 connects to the service provision server 27. In this manner, the electronic musical instrument 1 is connected to the NTP server 28. When the electronic musical instrument provided with the content data reproducing apparatus according to the third embodiment is connected to the service provision server 27, the content data reproducing apparatus according to the third embodiment provided for the electronic musical instrument 1 requests time data about the current date and time from the NTP server 28. When receiving the request for the time data, the NTP server 28 returns the time data about the current date and time to the electronic musical instrument 1. When receiving the time data about the current date and time, the electronic musical instrument 1 releases the communication connection with the NTP server 28. The electronic musical instrument 1 supplies the clock function provided for the timer 13 with the received time data corresponding to the current date and time as the current date and time. In this manner, the clock function, though not backed up by the power supply, can manage the current date and time while the electronic musical instrument 1 is turned on. The clock function is used for determining whether or not the musical performance restriction (content reproduction condition) is satisfied when the streaming service is granted.

When the clock function setup terminates, the connection process is performed between the electronic musical instrument 1 and the service provision server 27. In this manner, the electronic musical instrument 1 is connected to the service provision server 27 via the external interface 15, the provider 25, and the Internet 26. When the connection is made between the electronic musical instrument 1 having the content data reproducing apparatus according to the third embodiment and the service provision server 27, the electronic musical instrument 1 obtains list data capable of streaming services from the service provision server 27. The list data capable of the streaming service is displayed as a menu screen on the display device 21 for receiving streaming services. A user references this menu screen to select the content data for intended musical performance data. In this case, it may be preferable to use a browser, i.e., application software for browsing web pages, to obtain list data to display it on the display device 21. When the user uses the panel control device 19 to issue a data acquisition request for the content data, the electronic musical instrument 1 transmits a command to obtain the content data and information to select the content data to the service provision server 27. When receiving the data acquisition command, the service provision server 27 supplies the electronic musical instrument 1 with the musical performance restriction data in the data requested for acquisition and the management data including the destination for obtaining the content data.

When receiving the management data, the electronic musical instrument provided with the content data reproducing apparatus according to the third embodiment performs a connection process to connect with another service provision server 27' as a data acquisition destination indicated by a path contained in the management data. In this manner, the electronic musical instrument 1 is connected to the service provision server 27'. The electronic musical instrument supplies the service provision server 27' with a data acquisition request for content data. When receiving the data acquisition request, the service provision server 27' streams the requested musical performance data to the electronic musical instrument 1. The electronic musical instrument 1 receives the streamed musical performance data. The content data reproducing apparatus according to the third embodiment allows a temporary memory area of the storage device 14 to store the streamed musical performance data. The content data reproducing apparatus then releases the communication connection between the electronic musical instrument 1 and the service provision server 27'.

The electronic musical instrument 1 reproduces the musical performance data under restriction based on the condition according to the musical performance restriction data contained in the management data. That is, the electronic musical instrument 1 determines whether or not the musical performance restriction data (content reproduction condition data) extracted from the management data is satisfied. When the musical performance restriction data (content reproduction condition) is satisfied, the musical performance data can be read from the storage device 14 and supplied to the sound generator 22 for reproduction each time an event of the musical performance data reaches the reproduction timing. When it is determined that the musical performance restriction data (content reproduction condition) is not satisfied, the musical performance data stored in the storage device 14 is deleted and cannot be reproduced afterwards. The content reproduction condition represents one of or a combination of these reproduction conditions: a maximum running time to allow the reproduction for a specified time duration from the acquisition of the content data; a maximum session count to limit the reproduction of the obtained content data to a specified number of times; and a maximum time period to allow the reproduction for a specified period from the acquisition of the content data. Whether or not the maximum running time or the maximum time period is satisfied is determined with reference to the current date and time indicated by the clock function provided for the timer 13.

While there has been described that the content data reproducing apparatus automatically starts musical performance after downloading musical performance data is completed, the musical performance may start during downloading.

While there has been described that all the musical performance data is deleted from the storage device 14 when the content data does not satisfy the content reproduction condition, it may be preferable to delete part of the musical performance data. When the storage area becomes full, musical performance data can be automatically deleted from the earliest one first. Further, a user can perform a deletion process to delete musical performance data.

When the maximum running time in the content reproduction condition expires during reproduction, the musical performance data may be deleted upon termination of the reproduction to disable a succeeding reproduction session. Alternatively, the reproduction may be interrupted at any point and the musical performance data may be deleted to disable the following part of the reproduction.

Moreover, it may be preferable to provide different content reproduction conditions depending on different users or different regulations of different countries concerning the protection of contents data.

Furthermore, the service provision server 27 may identify types of clients requesting for streaming distribution and may transmit stream data to only specific client, types for which the streaming distribution is permitted. This makes it possible to prevent the streaming distribution from being provided for personal computers that can freely handle data.

While there has been described that the content data reproducing apparatus according to the present invention is provided for electronic musical instruments, the content data reproducing apparatus may be provided for electronic musical instruments having the communication function. In this case, a content reproduction program just needs to be installed on the electronic musical instrument having the communication function.

The invention claimed is:

1. A content data reproducing apparatus operating as an electronic musical instrument, the content data reproducing apparatus having a temporary memory for receiving stream data from an external content provision server, the stream data including content data and reproduction condition data, the content data reproducing apparatus comprising:
   a content data acquisition section that acquires the content data in the stream data from the external content provision server, the content data including automatic musical performance data for performance by the electronic musical instrument;
   a storage control section that temporarily stores the content data acquired from the stream data by the content data acquisition section in the temporary memory;
   a reproduction condition acquisition section that acquires the reproduction condition data from the stream data, the reproduction condition data defining a reproduction condition for reproducing the content data;
   a reproduction section that reproduces the content data acquired from the stream data by the content data acquisition section, the content data read from the temporary memory; and
   a reproduction control section operative for supplying the reproduction section with the content data read from the temporary memory for the reproduction in case that the reproduction condition acquired from the stream data by the reproduction condition acquisition section is satisfied, and operative for erasing the content data from the temporary memory in case that the reproduction condition is not satisfied.

2. The content data reproducing apparatus according to claim 1, wherein the content data acquisition section acquires the content data which contains the reproduction condition data, and the reproduction condition acquisition section extracts the reproduction condition data from the acquired content data.

3. The content data reproducing apparatus according to claim 1, wherein the reproduction condition acquisition section acquires the reproduction condition data together with destination information of the content data from an external content provision server, and the content data acquisition section acquires the content data from another external content provision server which is specified by the acquired destination information.

4. The content data reproducing apparatus according to claim 1, further comprising a time control section that acquires current date and time data from an external time source before acquiring the content data, and that sets an internal date and time according to the acquired current date and time data, wherein the reproduction control section determines whether the reproduction condition is satisfied or not with reference to the set internal date and time.

5. The content data reproduction apparatus according to claim 1, wherein the reproduction condition acquisition section acquires the reproduction condition data which determines the condition for reproducing the content data in terms of a maximum running time allowed for reproducing the content data, a maximum session count allowed for repeated sessions of reproducing the content data, or a maximum time period within which the reproducing of the content data is only allowed.

6. The content data reproduction apparatus according to claim 1, wherein the storage control section temporarily stores the content data in the temporary memory which is provided in a part of a random access memory.

7. The content data reproduction apparatus according to claim 1, wherein the storage control section temporarily stores the content data in the temporary memory which is provided in a part of a nonvolatile storage device.

8. A method of controlling a content data reproducing apparatus operating as an electronic musical instrument, the content data reproducing apparatus having a temporary memory for receiving stream data from an external content provision server, the stream data including content data and reproduction condition data, the method comprising the steps of:

acquiring the content data in the stream data from the external content provision server, the content data including automatic musical performance data for performance by the electronic musical instrument;

temporarily storing the content data acquired from the stream data in the temporary memory;

acquiring the reproduction condition data from the stream data, the reproduction condition data defining a reproduction condition for reproducing the content data;

determining whether the content data reproducing apparatus satisfies the reproduction condition each time the content data acquired from the stream data is to be reproduced;

reproducing the content data acquired from the stream data, the content data read from the temporary memory in case that the reproduction condition is satisfied; and erasing the content data from the temporary memory in case that the reproduction condition is no more satisfied.

9. A machine readable medium for use in a content data reproducing apparatus operating as an electronic musical instrument, the content data reproducing apparatus having a processor and a temporary memory for receiving stream data from an external content provision server, the stream data including content data and reproduction condition data, the medium containing a program executable by the processor for causing the content data reproducing apparatus to perform a method comprising the steps of:

acquiring the content data in the stream data from the external content provision server, the content data including automatic musical performance data for performance by the electronic musical instrument;

temporarily storing the content data acquired from the stream data in the temporary memory;

acquiring the reproduction condition data from the stream data, the reproduction condition data defining a reproduction condition for reproducing the content data;

determining whether the content data reproducing apparatus satisfies the reproduction condition each time the content data acquired from the stream data is to be reproduced;

reproducing the content data acquired from the stream data, the content data read from the temporary memory in case that the reproduction condition is satisfied; and erasing the content data from the temporary memory in case that the reproduction condition is no more satisfied.

\* \* \* \* \*